United States Patent
Kneebone

(10) Patent No.: US 7,340,845 B2
(45) Date of Patent: Mar. 11, 2008

(54) EVAPORATION APPARATUS

(75) Inventor: Howard Kneebone, Goulburn (AU)

(73) Assignee: Goulburn Wool Scour Pty Limited, New South Wales (AU)

( * ) Notice: Subject to any disclaimer, the term of this patent is extended or adjusted under 35 U.S.C. 154(b) by 0 days.

(21) Appl. No.: 10/525,313

(22) PCT Filed: Sep. 1, 2003

(86) PCT No.: PCT/AU03/01121

§ 371 (c)(1),
(2), (4) Date: Feb. 22, 2005

(87) PCT Pub. No.: WO2004/020923

PCT Pub. Date: Mar. 11, 2004

(65) Prior Publication Data

US 2006/0081340 A1    Apr. 20, 2006

(30) Foreign Application Priority Data

Aug. 30, 2002  (AU)  .............................. 2002951103

(51) Int. Cl.
*F26B 19/00* (2006.01)
(52) U.S. Cl. .............................. 34/60; 210/137; 422/4
(58) Field of Classification Search .................. 34/380, 34/512, 90, 60; 210/137; 422/4
See application file for complete search history.

(56) References Cited

U.S. PATENT DOCUMENTS 2,093,834 A * 9/1937 Gaugler ........................ 4/536
3,676,880 A * 7/1972 Kwake .......................... 4/499
4,122,561 A * 10/1978 Barr .............................. 4/499
4,961,271 A   10/1990 Butler
5,860,292 A * 1/1999 Augustine et al. ......... 62/259.3
6,182,463 B1 * 2/2001 Strussion et al. ............. 62/314
6,440,275 B1   8/2002 Domen

OTHER PUBLICATIONS

Derwent Abstract Accession No. 84-056240/09, ZA 8300655A, Gemplas Pty Ltd, Sep. 12, 1983.

* cited by examiner

Primary Examiner—S. Gravini
(74) Attorney, Agent, or Firm—Seyfarth Shaw LLP

(57) ABSTRACT

An evaporation apparatus 10 is shown in the form of an inflatable elongate plastic tube 12 that is fitted with fluid control means in the form of an inlet gas fan 14 and a gas outlet hole 16. The capacity of the inlet gas fan 14 and the size of the outlet hole 16 are matched so that the degree of inflation of the tube 12 can be maintained. In use the inflated tube 12 is partially filled with a volume of liquid 18 in a pool at a base thereof to be heated and evaporated by solar radiation and carried out of the tube 12 by a flow of gas therethrough. The pool of liquid 18 may include solid matter 19, or even contain substances such as dissolved solids or salts. Over time a significant quantity of this material can become deposited in the tube 12, and can be reclaimed.

17 Claims, 7 Drawing Sheets

EVAPORATION APPARATUS

This application is a U.S. National Phase of International Patent Application Ser. No. PCT/AU2003/001121, filed Sep. 1, 2003 which claims priority to Australian Patent Application No. 2002951103 filed Aug. 30, 2002.

FIELD OF THE INVENTION

The present invention relates to an evaporation apparatus. The apparatus can be applied to the evaporation of a waste water which contains suspended organic solid matter and will primarily be described with reference to this context. The invention has broad use in evaporative drying applications for all manner of other liquids which include particulate, dissolved or suspended substances.

BACKGROUND ART

Evaporative drying apparatus is known in the art, and can include basic drying basins or pans which are open to the atmosphere. In such equipment, reliance is placed on the sun or wind to evaporate a liquid-containing mixture placed in the drying basin or pan. On cloudy or cold days the evaporative process can be slowed or halted. In some situations it is undesirable to have an open evaporative drying system, for example because of seasonal rainfall which can actually increase the volume of water to be evaporated, or because of the possibility that birds or other creatures may attempt to land in or drink the water (which may contain toxic substances). In such instances, an enclosed evaporative drying apparatus is considered superior.

Enclosed apparatus for evaporative drying generally includes a fixed structure of some kind, such as a chamber through which an evaporative gas such as air is caused to flow and be subsequently expelled, or a ventilated greenhouse which is heated or retains heat to cause liquid evaporation followed by expulsion of the moisture-containing gases. Known evaporation chambers can be made of rigid materials or maintained in shape by an interior structure such as a frame having ribs,. Purloins or the like. The chambers can be complex to construct and expensive to purchase. Once this apparatus is assembled, it is not a simple matter to move it to another location.

SUMMARY OF THE INVENTION

In a first aspect the present invention provides an evaporation apparatus including:
an evaporation chamber that is inflatable; and
fluid flow control means for controlling the respective introduction and release of gas to and from the chamber to control the inflation of the chamber;
wherein in use the inflated chamber is adapted for containing a volume of liquid in a pool at a base thereof to be evaporated and carried out of the chamber as a vapor by the gas passing across the pool.

In use the evaporation chamber itself advantageously acts to contain the liquid to be evaporated, and to exclude rainwater and the activity of birds and animals. As a further example, an enclosed pool of liquid provides a large liquid/gas interfacial area for evaporation. Prior art apparatus is not adapted for containing a volume of liquid in a pool, and is merely arranged for evaporative drying of bulky solid goods. The evaporation apparatus of the invention represents an improvement over prior art apparatus because, being inflatable, the chamber does not require a complex inner or exterior support structure, allowing the apparatus to be readily collapsed and moved to a new location. The collapsible chamber of the invention thus represents a simple and cost effective solution for many evaporative drying processes because, being inflatable, it is relatively easy to set up and to operate, it can contain a large volume of liquid to be evaporated, and can be made internally accessible for periodic cleaning purposes.

Preferably the fluid flow control means is used to control the gas pressure and the flow rate of gas within the chamber.

Preferably the fluid flow control means includes a fan for introducing gas into the evaporation chamber, the fan sealably positionable at a hole made in a wall of the chamber. Most preferably the fan is a variable speed fan.

In one form, preferably the fluid flow control means also includes an outlet pressure release valve via which gas is released from the chamber, the valve sealably positionable at a hole formed in the wall of the chamber.

Preferably the fluid flow control means is arranged to substantially prevent the ingress of a diluent liquid other than the liquid to be evaporated into the chamber. For example, the gas introduction and outlet holes in the chamber can be arranged to be very small in size or to be shielded or covered in some way, to prevent the ingress of, for example, rainwater.

Preferably the evaporation chamber is an enclosure made of a flexible wall material. Preferably the flexible wall material comprises a single layer only of said material. When the term "single layer" is used, this includes both flexible walls which are made of one type of material with various different applied chemical or physical properties across the thickness of the same material, and those flexible walls which include internal stiffening elements formed into the core of a single layer of material, but excludes those walls made of discrete multiple layers of materials of an entirely different nature that are externally bonded or attached together at opposing faces thereof, for example.

Most preferably the enclosure is made of a plastic material, for example low density polyethylene. Some types of plastic have been shown to have sufficient strength to retain a significant mass of liquid and solids in a pool while remaining sufficiently flexible for inflation. A single layer of an appropriate flexible wall material is less costly to manufacture and less complex than some of the multiple layer inflatable chamber walls shown in the prior art, for example in U.S. Pat. No. 6,440,275.

Preferably the evaporation chamber is self-supporting in the inflatable state. Preferably the evaporation chamber in the inflatable state is arranged with a shape suitable for preventing the build up of a second fluid on the outer surface of the chamber, for example of a shape that naturally sheds or displaces rainwater from puddling thereon. Preferably the enclosure is elongate and tubular in shape.

The liquid to be evaporated can be introduced into the enclosure in a batchwise or a continuous manner via a liquid introduction port located in the exterior of the enclosure.

Preferably the vapor released from the chamber is condensed by a condenser means located external of the evaporation apparatus. Preferably the condenser means comprises a pipe which is arranged external of the evaporation apparatus for condensing of the vapor. For example, the pipe can be passed in a region underneath the chamber in or on surrounding ground, where temperatures are cooler and condensation of the vapor can occur for possible re-use elsewhere. In a variation, the gas in the pipe can be reintroduced into the chamber, for reasons of thermal efficiency.

In an alternative arrangement, the evaporation apparatus is adapted to be floated on a body of liquid.

In a second aspect the present invention provides a process for concentrating a substance in a mixture of the substance with a liquid, the process comprising the steps of:
passing the mixture into an inflatable chamber as defined in the first aspect; and
controlling the respective ingress and release of gas into and out of the chamber,
wherein over time the substance is concentrated in the mixture in a base of the inflatable chamber for subsequent collection.

In a third aspect the present invention provides a process for concentrating a substance in a mixture of the substance with a liquid, the process comprising the steps of:
passing the mixture into an inflatable chamber as defined in the first aspect; and
causing a gas to flow across a pool of the liquid in a chamber to cause a concentration of the substance in the liquid over time.

Preferably in the process of the second or third aspects the liquid to be evaporated can be introduced into the inflatable chamber in a batchwise or a continuous manner.

BRIEF DESCRIPTION OF THE DRAWINGS

Notwithstanding any other forms which may fall within the scope of the present invention, preferred forms of the invention will now be described, by way of example only, with reference to the accompanying drawings in which.

MODES FOR CARRYING OUT THE INVENTION

Referring to a preferred embodiment shown in FIGS. 1 to 5, an evaporation apparatus 10 is shown which comprises an evaporation chamber in the form of an inflatable elongate tube 12 that is fitted with fluid flow control means in the form of an inlet gas fan 14 and a number of gas outlet holes 16. The capacity of the inlet gas fan 14 and the size of the outlet holes 16 are matched so that the degree of inflation of the tube 12 can be maintained. The tube 12 is generally made of a thick-walled plastic material although other flexible materials suitable for containing gases and liquids are acceptable. A number of particularly preferred forms of plastic material are outlined in the following description.

Figure 5:
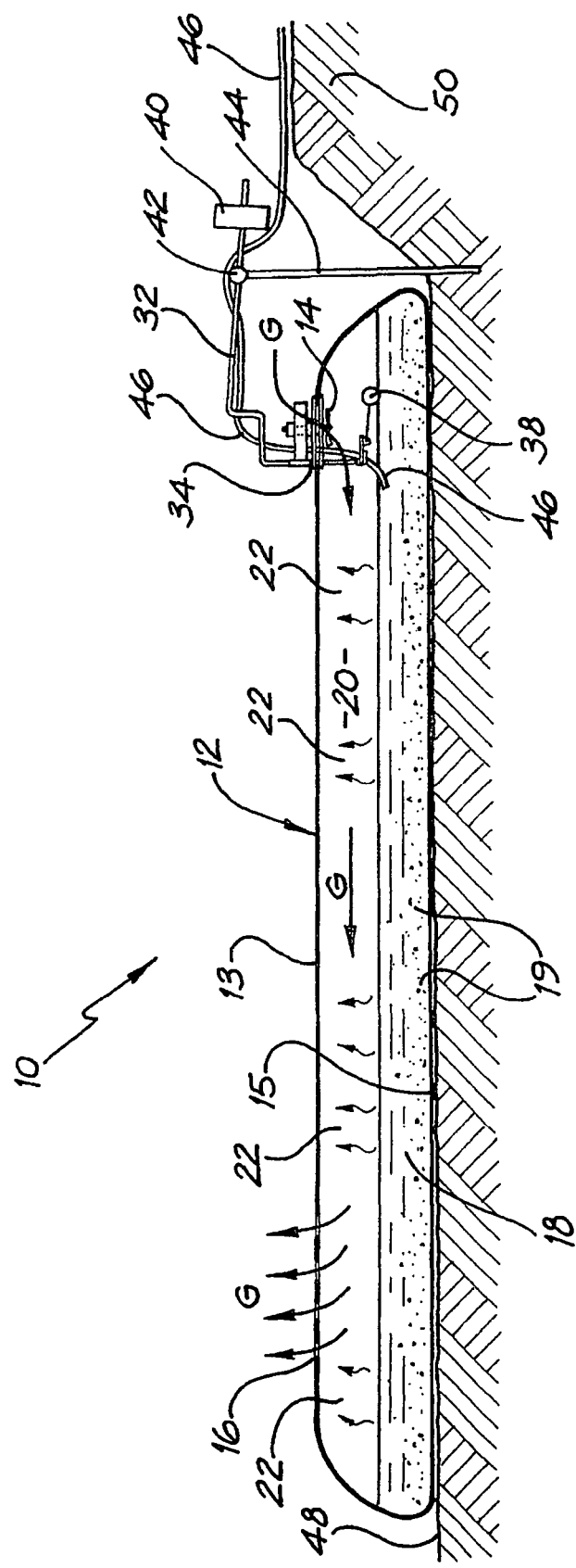
FIG. 5 is a schematic diagram of a side sectional elevation of the apparatus shown in FIG. 1.

In use the inflatable tube 12 is partially filled with a volume of liquid 18 to be evaporated, as shown schematically in FIG. 5. The liquid 18 may be accompanied by or include solid matter 19, for example as a slurry or pulp, or may even contain dissolved solids or salts. In operation of the apparatus 10, the liquid 18 becomes heated in the tube 12 by solar radiation and is then vaporized to form a vapor 22. A flow G of a gas such as air is initiated through the volumetric space 20 located above the liquid 18 and in the tube 12. The flow of gas G is along the length of the tube 12 from the inlet fan 14 to the outlet holes 16. The flow of gas G carries the heated liquid vapor 22 out of the apparatus 10 via the outlet holes 16. The solid matter 19 remains in the evaporation tube 12, and in time a significant quantity of this material becomes deposited in the tube 12, which can be reclaimed as will be further described. Typically the liquid 18 which is evaporated is water, although the apparatus 10 has application to non-aqueous liquid evaporation situations, for example a pulp containing ethanol.

Figure 4:
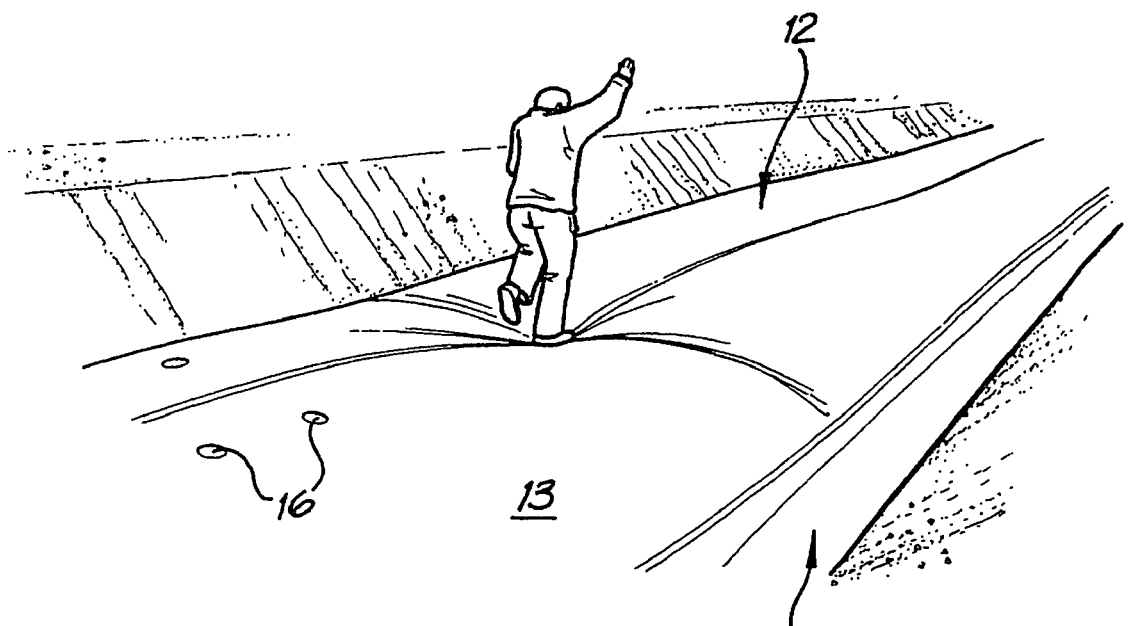
FIG. 4 shows a further perspective view of a portion the apparatus shown in FIG. 1.

The inlet gas fan 14 and the area of the outlet holes 16 are used to control the gas pressure and the flow rate of gas flow G within the tube 12 and thus the degree of inflation of the evaporation tube 12. In the preferred embodiment, the gas pressure in the evaporation tube 12 in use is maintained at around one inch of water gauge pressure (ie. around 5-10% above normal atmospheric pressure) and the flow rate of gas through the inflated and ventilated evaporation tube 12 is around 3.0 to 3.5 $m^3$/second. The inflated tube 12 is thus capable of withstanding collapse to ground with the placement of weight thereon, as shown in FIG. 4. The tube 12 typically has dimensions of 50 meters in length and 4.7 meters in width and in use is filled to an operational depth of liquid of around 400-460 millimeters, with a gas space above the top of the fluid of around 600 millimeters. The typical gas flow G of 3.0 to 3.5 $m^3$/second can be used to evaporate around 4 liters per minute of liquid 18.

Figure 1:
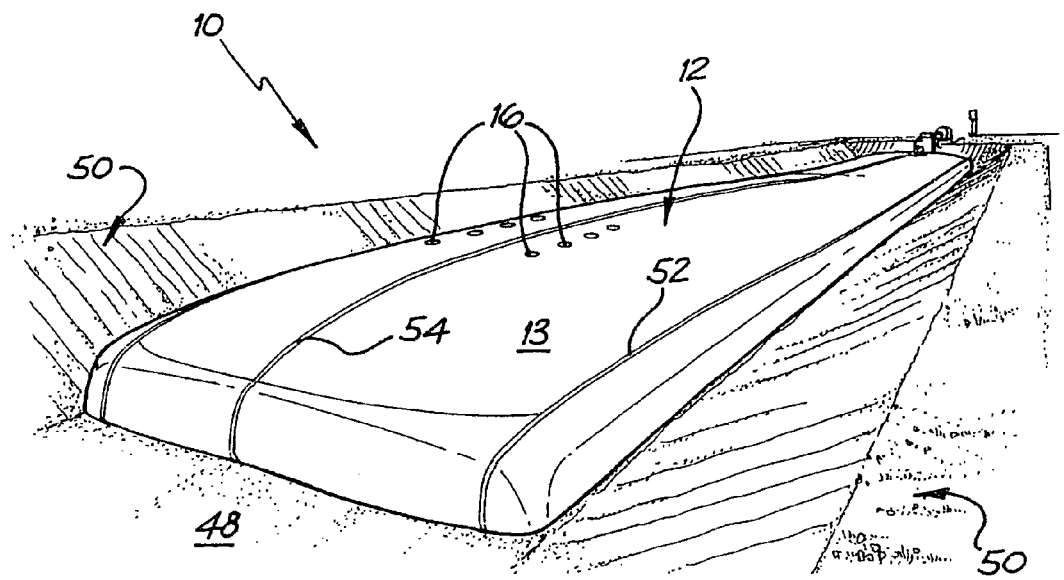
FIG. 1 shows a perspective view of one embodiment of an evaporation apparatus in accordance with the invention.
Figure 2:
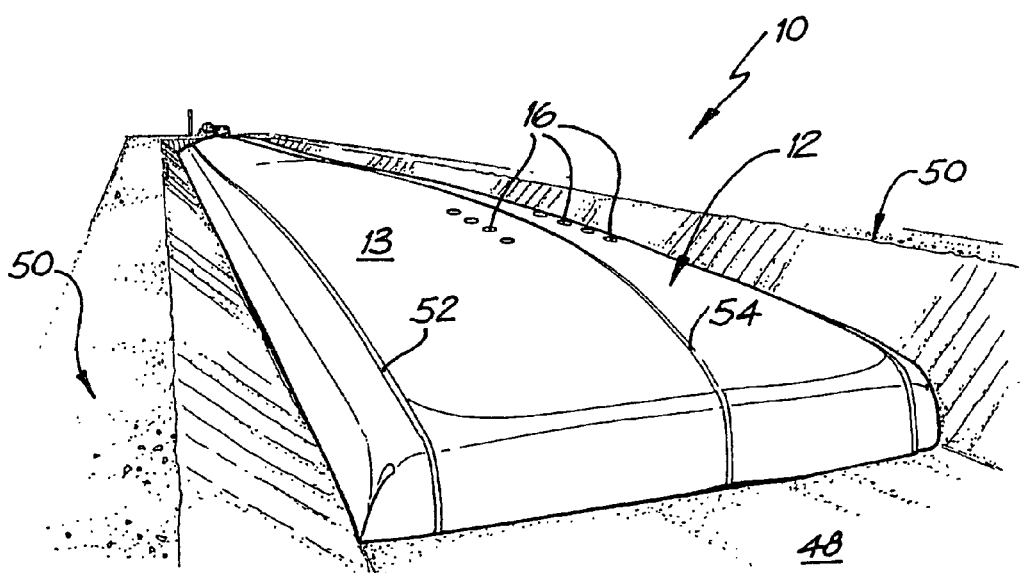
FIG. 2 shows a further perspective view of the apparatus shown in FIG. 1.
Figure 3:
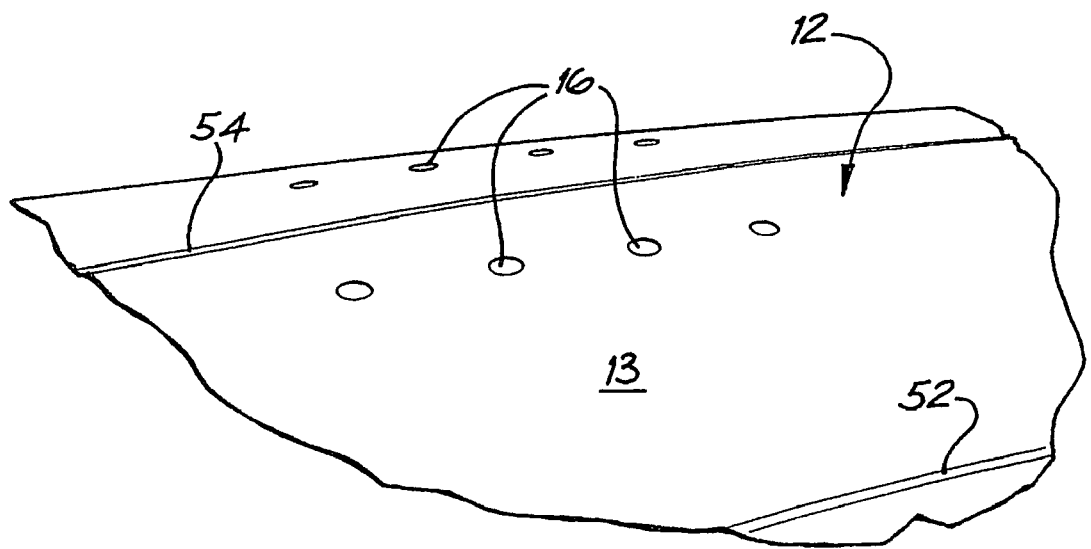
FIG. 3 shows a further perspective view of a portion of the apparatus shown in FIG. 1.

The gas and vapor outlet holes 16 are simply cut out of the evaporation tube 12 wall at a distal end from the inlet gas fan 14. The holes 16 are approximately 120 millimeters in diameter. The use of eight holes 16 of this diameter, as shown in the preferred embodiment in FIGS. 1 to 3, represents an improvement over the use of a single 300 millimeter diameter outlet hole because it was found that in some situations the single hole created a fluid vortex which lifted feed liquid for evaporation out of the evaporation chamber 12 with the gas flow G.

In other embodiments each outlet hole can have a pressure release valve or a one-way valve sealably fitted thereto via which gas can be released from the evaporation tube 12, as a further way of controlling the inflation of the evaporation tube 12 and the gas flow G therethrough. In still other embodiments, the outlet hole(s) can merely be slits or other shapes of openings in the tube. In general it has been found that the flow of gas out of the outlet holes 16 is of sufficient pressure to prevent the ingress of diluents such as rainwater from entering the chamber 12 via the holes 16.

It is further noted that the outlet holes 16 of the preferred embodiment shown in FIGS. 1 to 5 have a polystyrene float positioned nearby, tied to the inside of the uppermost surface 13 of the tube 12 by stiff cabling. In normal usage, such a float is spaced away from the hole(s) 16 by the stiff cabling so that gas G and vapor 22 can exit from the tube 12. However, when the tube 12 is deflated after a period of use (for example during a power failure which causes the inlet fan 14 to stop) the uppermost surface 13 of the tube 12 can become lowered and contact the surface of the liquid 18 located within the tube 12. In this collapsed position, the polystyrene floats are then pressed against the hole 16 near which they are tied to block the hole 16 so that the exit of liquid 18 from the collapsed tube 12 is substantially prevented and the liquid is secured in the tube.

Figure 9:
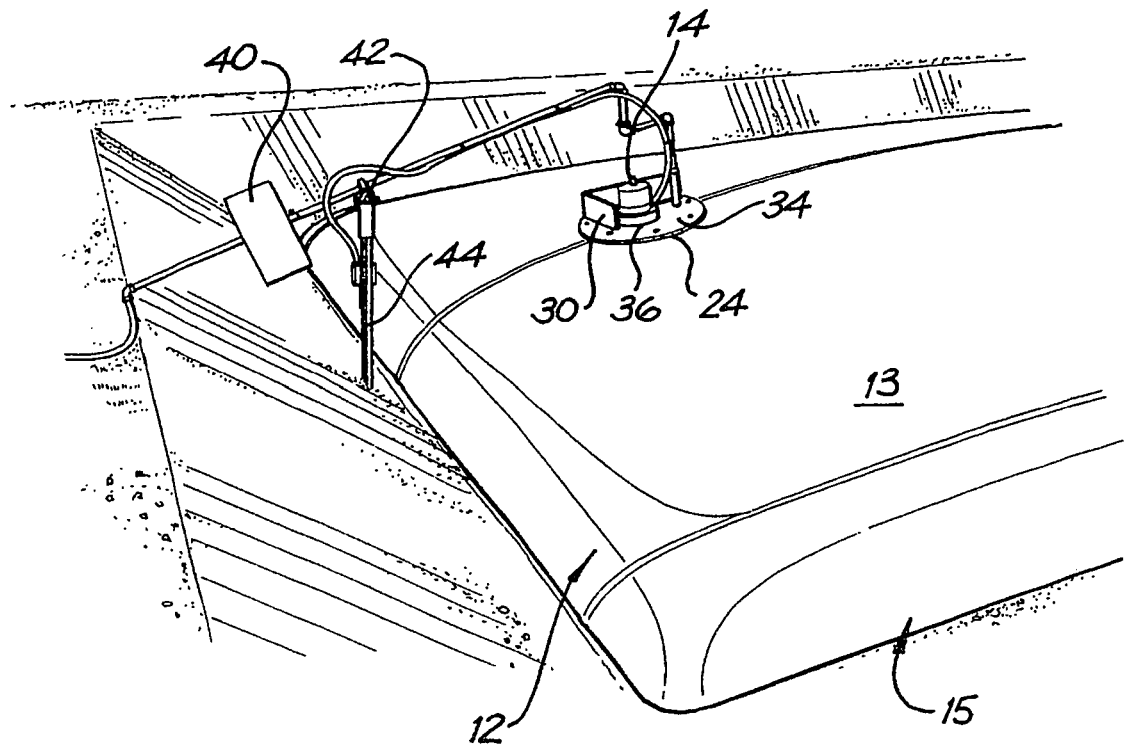
FIG. 9 shows a perspective view of a part of the apparatus shown in FIG. 1, the part being used for the introduction into the chamber of gas and liquid to be evaporated.
Figure 10:
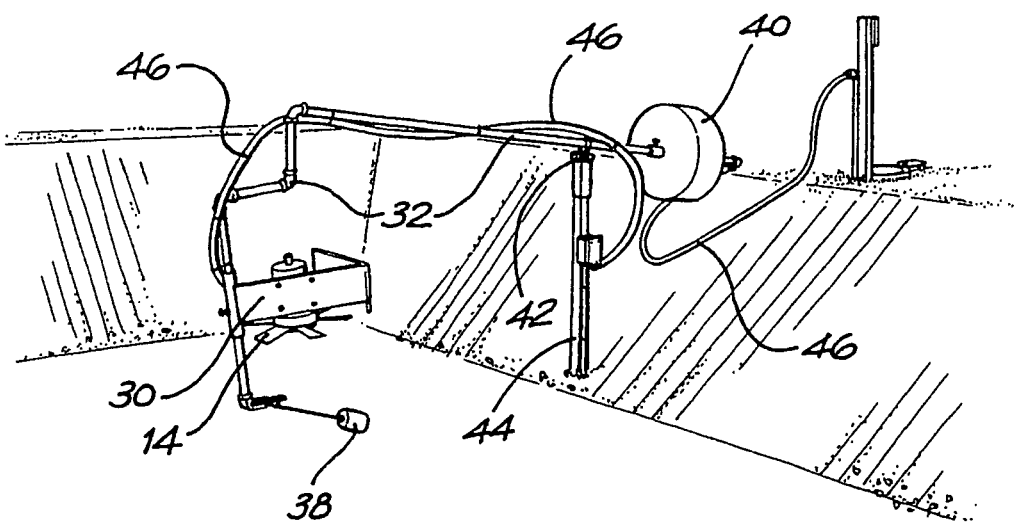
FIG. 10 shows a perspective view the part of the apparatus shown in FIG. 9 when the part is disassembled from the evaporation apparatus.

The inlet gas fan 14 which is used for introducing air into the evaporation tube 12 is positioned at a hole 24 made in the wall of the tube 12 so that the air which is forced into the tube 12 by the fan 14 does not leak out of the tube 12 at the rim of the hole 24. This sealing can be by way of any suitable adhesive or substantially airtight clamping arrangement, as will be described. A detailed view of the gas inlet fan 14 and the way it is mounted in use to the evaporation tube 12 of the preferred embodiment is shown in FIGS. 9 and 10.

The fan 14 shown is a variable speed fan (of around 0.37 kW power draw, and a maximum speed of 2850 rpm) which is mounted to an orthogonally-arranged L-shaped frame 30 which is attached to a support arm 32. In use the frame is mounted to an annular support plate 34 which is seated on the upper exterior surface 13 of the tube 12 and around the perimeter of the hole 24. The support plate 34 has a central hole 36 into which the fan 14 is thus held in position. The annular support plate 34 itself is bolted to another like support plate located on the interior surface of the tube 12 so that a portion of the inflatable tube 12 is clamped therebetween in a gas-tight manner. In other embodiments it is envisaged that the annular support plate 34 can also be glued or otherwise fastened to the exterior surface 13 of the tube 12. Only minor quantities of rainwater can enter the tube 12 in the small area between the fan blades and the rim of the central hole 36 of the support plate 34. In some instances a rain guard can be fitted above the fan 14 to completely prevent the ingress of rainwater etc. into the hole 36 in the support plate 34. In the preferred embodiment the hole 24 in the tube 12 is 300 millimeters in diameter.

In addition to this, the support arm 32 has a float 38 mounted on it which indicates the level of feed liquid 18 (or liquid/solid mixture) inside the evaporation tube 12 during operation. The float 38 can actuate a liquid inlet/make-up valve to control the flow of feed liquid 18 (and/or liquid and solids) into the evaporation tube 12, in a similar manner to the way in which a toilet cistern operates. The appearance of the float 38 inside the tube 12, located on the lowermost end of the support arm 32, is shown in FIG. 10 with the tube 12 being removed for clarity. A counterweight 40 is positioned on the distal end of the support arm 32, with the support arm 32 and the counterweight 40 held aloft by a pivotably bearing 42 located on a ground-engaged support post 44. The counterweight 40 is of an equivalent weight to that of the float 38, support arm 32, support frame 30, support plate 34 and gas inlet fan 14. Such a counterweight arrangement means that there is no effective mechanical weight of fan 14, support plate 34 etc. placed on the exterior surface 13 of the inflated tube 12, to reduce any likelihood of tearing or damaging the tube 12. The support arm 32 can be pivoted about the pivotably bearing 42 both sideways and up and down in response to the raising and lowering of the level of liquid 18 in the tube 12 and in response to the effect of cross-winds on the inflated tube 12 which can cause a rippling of the upper surface 13 of the tube 12.

In use, new fluid/solid mixture (18/19) to be treated by evaporation is passed into the tube 12 via a fluid inlet pipe 46 which is mounted to the support arm 32. As shown in FIGS. 9 and 10 the fluid inlet pipe 46 passes through the central hole 36 in the annular support plate 34 and into the evaporation tube 12. The inlet make-up control valve is located on the ground adjacent to the tube 12, and can, for example, be an electrically operated water pump fed from a feed tank. Gravity feed via an actuated valve is also feasible. In still further embodiments the fluid inlet pipe 46 can be located in a hole in any convenient position in the wall of the evaporation tube 12, and not necessarily associated with the hole 36 in the support plate 34 of the inlet gas fan 14.

In operation the liquid to be evaporated can be introduced into the tube 12 in a batchwise or in a continuous manner via the fluid inlet pipe 46, depending upon the type of liquid or liquid-solid mixture being dried and as the situation requires. Thus in some batch or semi-batch situations all of the liquid present can be evaporated so that the remaining solids or dissolved salts are concentrated and completely dried, or alternatively the apparatus 10 can be operated continuously so that a large quantity of liquid can be evaporated over time to allow cumulative concentration of solid or of dissolved substance(s).

Figure 6:
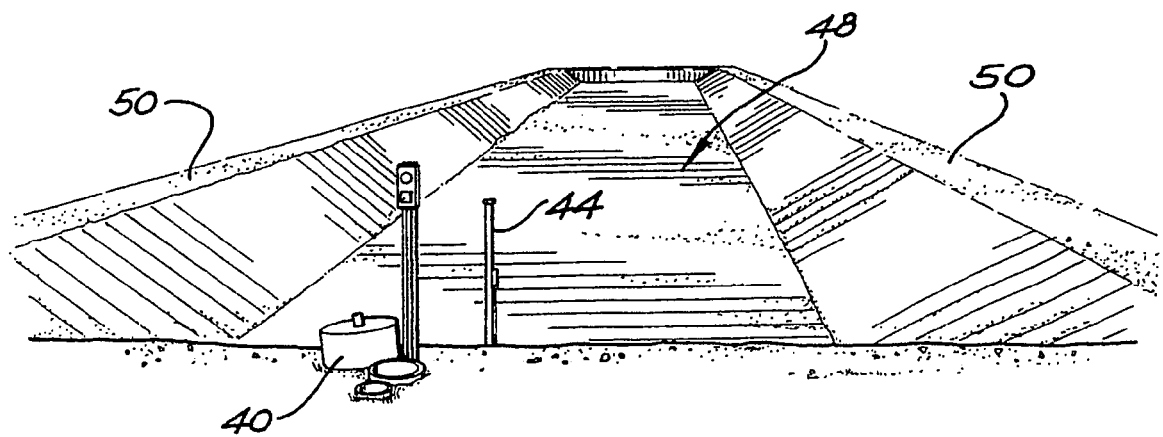
FIG. 6 shows a perspective view of a contoured trough in surrounding ground arranged for locating the apparatus shown in FIG. 1.

The apparatus 10 of the preferred embodiment is generally located in a trench 48 or other excavated or bounded recess in the surrounding ground 50 to provide extra storm and wind protection and stability, for example to prevent the tube from sideways rolling movement. A suitable trench 48 is shown in FIG. 6.

In further embodiments the in use weight of the liquid and solids undergoing heating and evaporation in the evaporation tube 12 is sufficient to prevent the apparatus 10 from moving without being positioned in a ground recess. Depending on the chosen material which makes up the inflatable tube, the edges of the trench 48 can be lined with a support material such as car tires to stabilize the inner sides of the trench 48 and to reduce any abrasion or wear on the exterior of the tube 12.

Again depending on the chosen tube 12 material, the base of the trench 48 can be lined with, for example, a porous woven polypropylene underlay upon which the evaporation tube 12 is seated. An underlay can give mechanical protection for the tube 12 against puncturing while also reducing the chemical degradation of the plastic material used to form the tube 12 by ground leaches etc. In the event of leakage from the evaporation tube 12, the underlay can be made of an impervious material to prevent spilled liquids and solids from entering the water table for some time until the leak in the tube 12 can be plugged. In use the trenches 48 are usually fenced off to prevent animals from accessing the tubes and causing any damage thereto.

The evaporation tube 12 of the preferred embodiment shown in FIGS. 1 to 5 is typically around 50 meters in length and around 4.7 meters in width, although in other embodiments the length can be up to around 150 meters and the width of the tube can be anything from 2 meters to 10 meters depending on the topography of the location. The tube 12 of the preferred embodiment is made by plastic welding the ends of two different types of single layer geomembrane sheets together. The base portion 15 of the tube 12 in contact with surrounding ground (which includes the sides of the tube 12 in contact with the inner walls of the trench 48) is made of a low density polyethylene geomembrane sheet which is impervious to petrochemicals, acids and alkalis, whilst the upper surface portion 13 of the tube 12 is also made of a low density polyethylene geomembrane which includes an ultraviolet light stabilizer. The plastic welded joins 52 between the upper 13 and lower 15 geomembrane sheet portions are visible in FIGS. 1 and 2. Each of the basal 15 and upper 13 sheet portions themselves can be manufactured from strips of these geomembrane that are welded together to form a tube of any chosen width or length, for example the visible join 54 between the portions which make up the upper sheet 13. As shown in the drawings, the inflated tube 12 has a curved upper surface shape such that it naturally sheds rainwater to avoid puddling thereon.

Other types of suitable commercial plastic materials are also available in tubular lengths, and once a prescribed length of tubing is cut, the opposing ends may simply be rolled or tied closed and physically sealed or clamped airtight, or welded or formed together. With such plastic materials, the edge welding together of two different types of sheets of plastic is not required. One known tubular product is made of a single layer of plastic material that has three distinct properties: an outermost surface of the tube including an ultraviolet light stabilizing component (to maintain product life while exposed to the sun over long periods), an inner surface with a resin component (which ensures that the tube interior is resistant to chemical degradation by acids, alkalis, chlorides, greases, oils etc. which may be found in the liquid/solid mixtures to be evaporated), and a central portion of the tube wall made of a high strength polypropylene to give the tube structural strength. Thus the tube 12 can be placed in a location which is exposed to the environment (leg solar radiation), it may contain liquids and solids considered too chemically aggressive for some plastics, and still generally have sufficient strength to resist impact from tree branches, hailstones or other debris while maintaining a rigid tubular shape when inflated in use. With this particular type of material, plastic welding or other hot-forming is to be avoided, as this can cause damage to the integrity of the innermost surface resin that resists chemical degradation.

In further embodiments the evaporation tube can be made of a reinforced flexible wall material, such as plastic with reinforcing mesh fitted internally therein to for extra strength. In still further embodiments the evaporation chamber need not be elongate and tubular in shape, but can be square, rounded or oval in shape, or any other convenient shape that plastic material can be extruded or formed into so as to be able to contain a pool of a liquid to be evaporated with a large surface area for evaporation.

Figure 7:
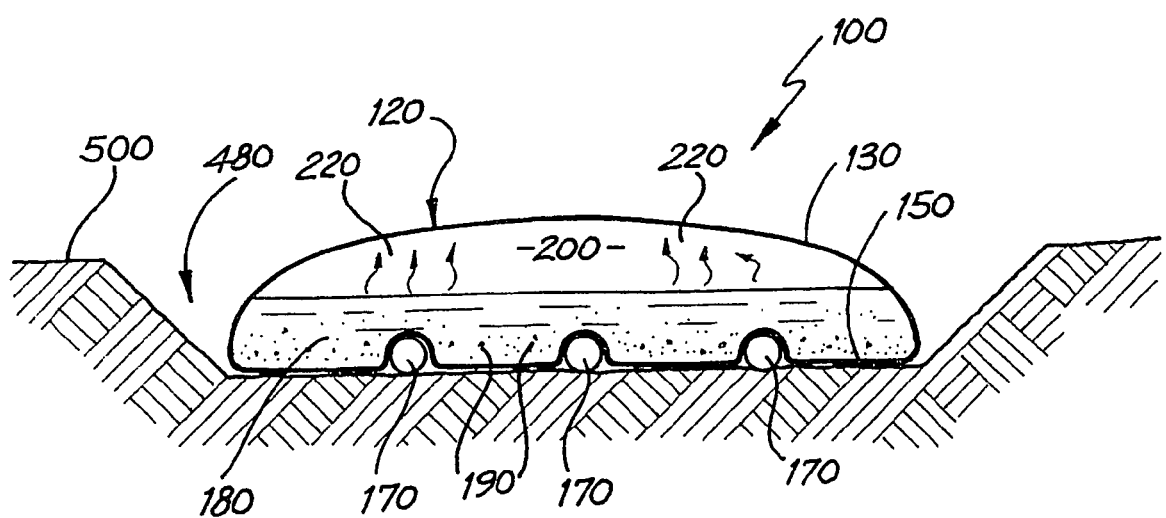
FIG. 7 is a schematic diagram of a cross-sectional elevation of a further embodiment of an evaporation apparatus in accordance with the invention, the cross-section located at line 7-7 in FIG. 8.
Figure 8:
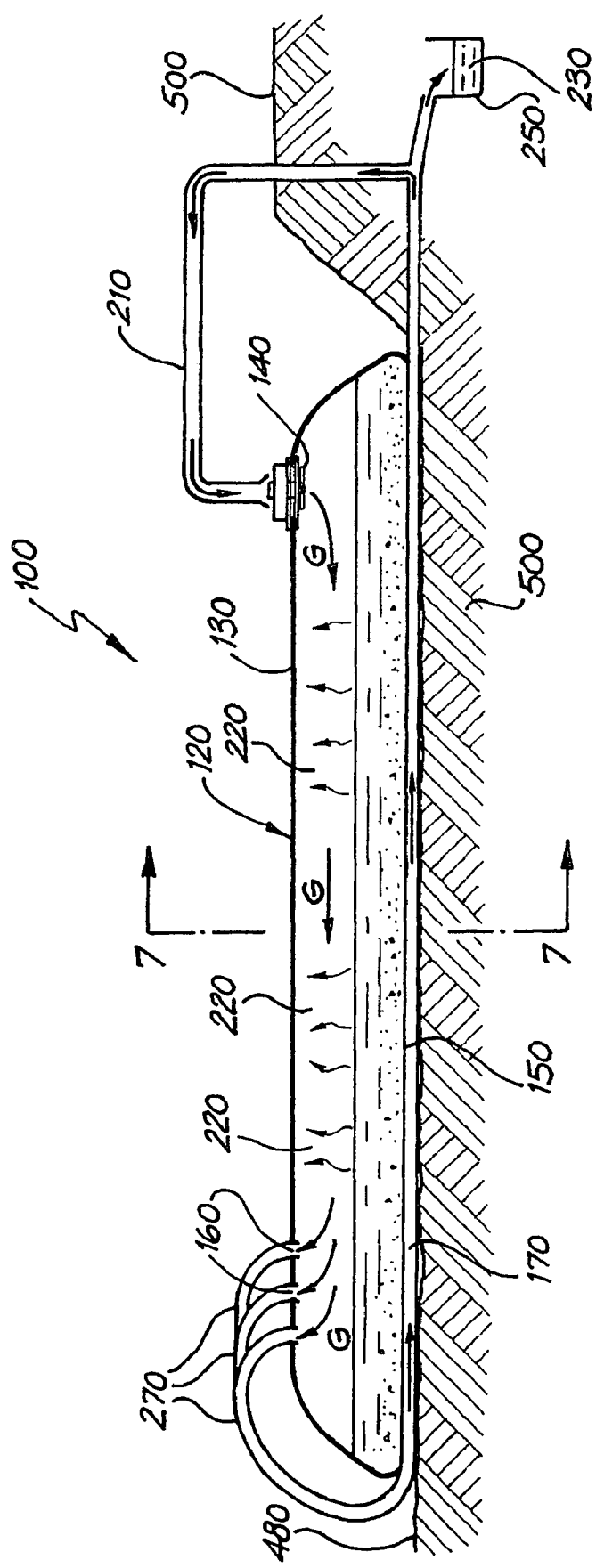
FIG. 8 is a schematic diagram of a side sectional elevation of the apparatus shown in FIG. 7.

Referring now to FIGS. 7 and 8, a further preferred embodiment of an evaporation apparatus 100 in the form of an inflatable elongate tube 120 is shown that is fitted with fluid control means in the form of an inlet gas fan 140 and gas outlet hole(s) 160. In all respects the evaporation tube 120 operates similarly to the evaporation tube 12, and thus a repeat description of the use of the tube 120 is not given here. Where indicated in FIGS. 7 and 8, like parts are given corresponding numbers with an additional "0". In the embodiment of FIGS. 7 and 8, however the outlet hole 160 is fitted with one or more pipes 270 which are configured to convey the heated gas G and vapor 220 out of the inflatable tube 120 and into various ducts 170 located on the surface of surrounding ground 500 at the base of the trench 480 and underneath the tube 120 itself where cooler temperatures are found. Whereas the surface of the liquid 180 in the inflatable chamber is normally around 40-50° C., (and the temperature of the gas and vapor exiting the tube 120 via the hole(s) 160 is approximately the same) the temperature in the ducts 170 on the surrounding ground can be some 10-20 celsius degrees cooler, thus allowing the vapor to become condensed and the gas G to be cooled. Some of the heat lost from the condensed vapor 220 and gas G can be transmitted by conduction or radiation to the base 150 of the inflatable tube 120 so as to maximize the thermal efficiency of the overall process. The ducts 170 underneath the tube 120 can be made of steel or plastic pipe, for example. The gas G can be conveyed via these pipes and returned to the region of the inlet fan 140 by recycle pipe 210, and the condensed liquid distillate 230 can flow under gravity to a collection receptacle 250 for possible re-use in other processes where clean water is required.

In still further preferred embodiments of the evaporation apparatus one or more pipes carrying another fluid can be located underneath, alongside or even passing within the lower interior portion of the evaporation tube 12. These pipes can contain any fluid which requires pre-heating so that more use is made of the solar energy collected by the evaporation tubes. The pipes can typically be made of black polypropylene or other materials, and the heated fluid can be used to transfer heat to other processes in any adjacent domestic or industrial application.

The invention can provide an improved enclosed evaporation chamber compared with known apparatus because the chamber is frameless and does not require complex inner or exterior support structure of prior art apparatus. This also allows the apparatus to be readily collapsed and possibly moved to a new location. A metal rib structure in a solar-heated plastic greenhouse can become extremely hot, and these hot metal rafters or Purloins can melt any plastic tubing or sheeting that comes into physical contact with the rib or support structure. The frameless structure of the present invention avoids this.

In normal usage of the preferred embodiments, it may be expected that the temperature of the flow of gas G and liquid vapor 22 can reach as much as 80° C. due to the retention of solar energy in the tube, so a support structure which has a high heat capacity can become quite hot and would be undesirable from this point of view. Standard greenhouse structures have a large proportion of their cost involved in the structural members, so it may be expected that the evaporation tube of the invention would offer a considerably cheaper alternative from a capital cost perspective. In addition, because the evaporation chamber of the invention is arranged to contain a volume of liquid in a pool, if any structural elements were present they would likely be subject to corrosion and failure whereas this is not the case in the preferred embodiments of the invention.

The evaporation chambers described in the preferred embodiments can be operated so as to control the liquid evaporation to any desired rate depending on the selection of fan operating speed, and air throughput, as well as the extent to which the sun is available to heat the chamber and enhance the evaporation rate. One of the major advantages of this type of equipment is that the material being evaporated is completely sealed from the surrounding environment, so that very toxic substances present in liquids can be isolated without fear of contaminating local groundwater. The tubular structures of the preferred embodiments have a lower footprint (ie. take up less ground area) than would be the case for an open pan evaporation system, and can be positioned on the contours of a hillside in an undulating geographic region with minimal visual impact.

The tubes 12, 120 have the additional advantage of being sealed to ingress of diluents such as rainwater or groundwater run off thus decreasing the overall drying load requirement compared with open pan evaporation systems. In fact, if solid and liquid mixtures are subject to evaporation in the preferred tubular evaporation chambers 12, 120, it is possible to dry out these mixtures completely in a batchwise manner so that the dried solids can be collected and used for other purposes or properly disposed of. In order to collect the solid materials, in some embodiments the evaporation tube can be deflated and then rolled and/or lifted or moved into a position where the solids can be dry discharged and collected. This collection and removal operation can also be conducted after longer term continuous evaporation processing is concluded, usually when the inner base of the evaporation tube becomes sufficiently filled with deposited solid matter. The convenience of such removal of course depends on the size and shape of the evaporation tube used.

The evaporation tubes 12, 120 of the preferred embodiments can be applied to the evaporative drying of many water-based effluent streams, such as mine tailings dam runoff, particular where that runoff cannot be allowed access to the groundwater (leg uranium mine water, gold mine cyanide-containing waste). In applications from industry to farms and feed lots, it is also important that water that is heavily contaminated with pesticides, or with various organic contaminants, be collected and evaporated to concentrate the undesirable solid material for proper disposal or further treatment.

In one example, a liquid containing organic contaminants that are the by-products of a wool scouring operation has been collected and evaporated to leave a concentrated organic solid material which is potentially rich in potassium for further use as a fertilizer. The organic contaminants, which otherwise cannot be allowed to enter the local ground water table (which provides a source of drinking water for an urban region) can thus be usefully re-used elsewhere as a vendible product. Because of the generally low solids content of the wool scour wastewater, it is envisaged that the continuously-operated evaporation tubes will not require removal of organic contaminants until after a period of 4 to 6 years of operation. It is also possible at any stage in the life of the evaporation apparatus to dry the liquid and deposited substances in the tube to a point where only a thick concentrate slurry remains, and then to close off the feed liquid stream, access the tube by incision to insert an inlet for a slurry pump, and to evacuate the high solids slurry contents. The tube can then be resealed by plastic welding and normal evaporative drying operations resumed. It is expected that the tubes of the preferred embodiment that are made of a plastic material will be UV stable and will not become embattled over a period of at least five years.

Figure 11:
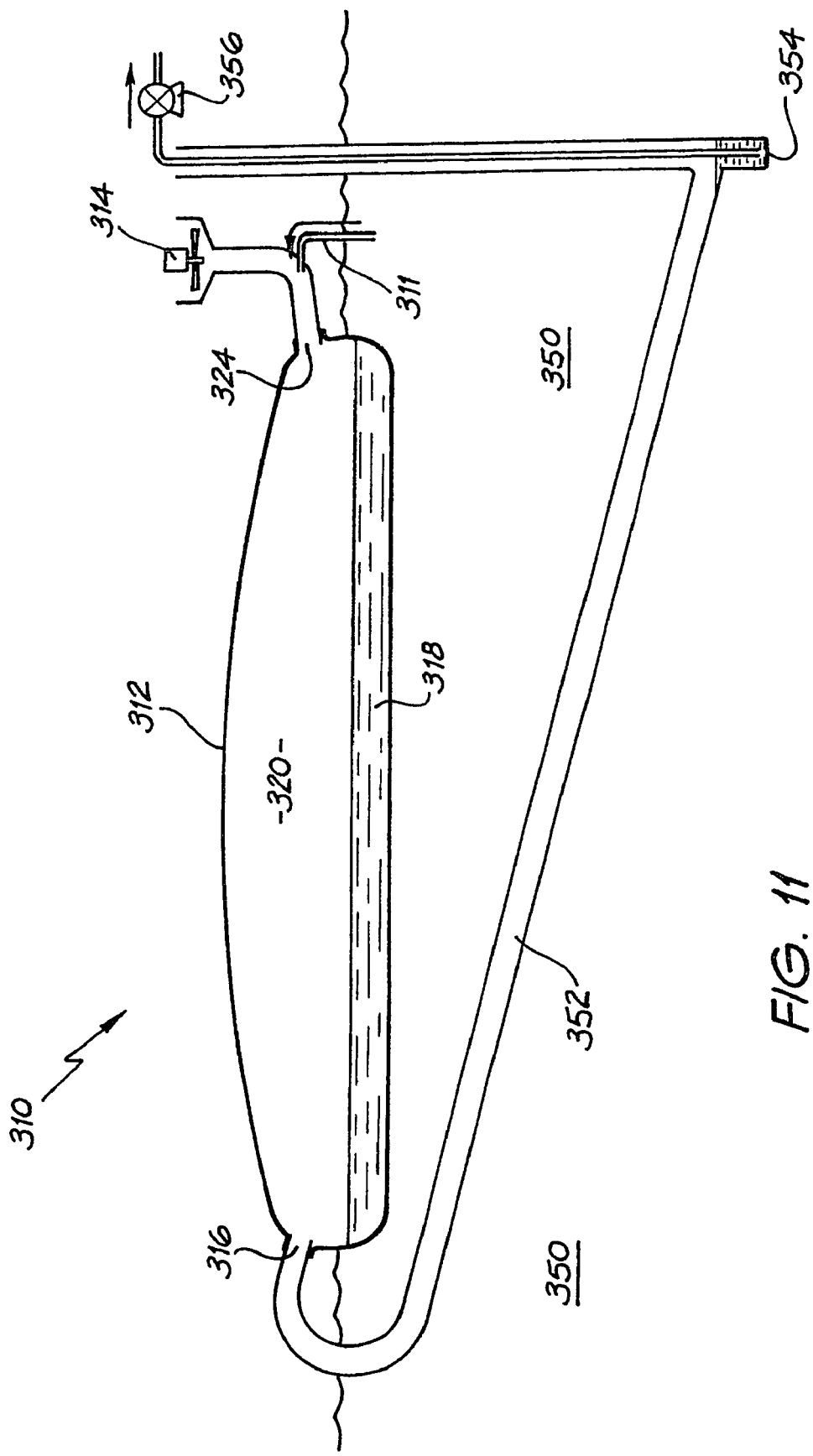
FIG. 11 shows a side sectional view of another embodiment of an evaporation apparatus in accordance with the invention.

The apparatus of the invention can also be applied to the desalination of groundwater in arid areas provided that the vaporized water can be condensed in some sort of external condensation apparatus. In a further preferred form of the invention as shown in FIG. 11, a tubular evaporation apparatus 310 is arranged for floating on a body of liquid 350, for example the ocean or a lake. In such an embodiment, salty or brackish water is introduced into the inflatable evaporation chamber 312 via inlet pipe 311 and hole 324. The chamber 312 is fitted with fluid control means in the form of an inlet gas fan 314 and a gas outlet hole 316. Once again the capacity of the inlet gas fan 314 and the size of the outlet hole 316 are matched so that the degree of inflation of the chamber 312 can be maintained, and also so the apparatus 310 can float on the body of liquid 350 (ie. the combined weight of apparatus and liquid being evaporated is made buoyant by the volume of entrapped gas in the chamber 312.) The evaporation chamber 312 is generally made of the same materials as described earlier for the evaporation tubes 12, 120. In all respects the evaporation chamber 312 operates similarly to the evaporation tubes 12, 120, and thus a repeat description of the use of the chamber 312 is not given here. Where indicated in FIG. 11, like parts as shown in the embodiment of FIGS. 1 to 5 are given corresponding numbers with an additional "3" prefix.

In the embodiment of FIG. 11, the outlet hole 316 is joined to a tubular section 352 protruding from the chamber 312 and extending there below into the body of liquid 350. In this tubular section 352 the evaporated water vapor (heated by the action of the sun on the chamber 312 and removed by the action of the fan 314) can be condensed because the ocean water is likely to be cold, particularly at depths lower than the floating chamber 312 (at depths where the sun does not heat the water 350). The condensed water vapor can then be extracted from the lowermost portion 354 of the tube 352 by a pump 356 and sent elsewhere for use, leg as fresh water.

The materials of construction of the evaporation chamber portion of the apparatus can comprise any suitable materials which can be shaped, formed and fitted in the manner so described, such as flexible plastics which can be molded and then welded or shaped to give a structurally sound apparatus that can withstand extremes of weather and temperature.

It is to be understood that, if any prior art information is referred to herein, such reference does not constitute an admission that the information forms a part of the common general knowledge in the art, in Australia or any other country.

Whilst the invention has been described with reference to a number of preferred embodiments it should be appreciated that the invention can be embodied in many other forms.

The invention claimed is:

1. Evaporation apparatus comprising:
   a base portion, side portions and an upper portion all of which are formed from fluid impervious flexible materials and define an evaporation chamber that is inflatable;
   a gas introduction port by which gas may enter the chamber and a gas release port by which gas leaves the chamber;
   fluid flow control means for controlling the introduction of gas to the chamber via the gas introduction port and release of gas from the chamber via the gas release port to control the inflation of the chamber;
   wherein the base and side portions define a fluid impervious region which in use surrounds a volume of liquid which forms a pool at a base of the apparatus to be evaporated and carried out of the chamber as a vapour by the gas passing across the pool; and
   wherein the gas release port is located above the level of liquid in the pool.

2. Apparatus as claimed in claim 1 wherein the fluid flow control means is used to control the gas pressure and the flow rate of gas within the chamber.

3. Apparatus as claimed in claim 1 wherein the fluid flow control means includes a fan for introducing gas into the evaporation chamber, the fan sealably positionable at a hole made in a wall of the chamber.

4. Apparatus as claimed in claim 3 wherein the fan is a variable speed fan.

5. Apparatus as claimed in claim 1 wherein the fluid flow control means also includes an outlet pressire release valve via which gas is released from the chamber, the valve sealably positionable at a hole formed in the wall of the chamber.

6. Apparatus as claimed in claim 1 wherein the fluid flow control means is arranged to substantially prevent the ingress of a diluent liquid other than the liquid to be evaporated into the chamber.

7. Apparatus as claimed in claim 1 wherein the evaporation chamber is an enclosure made of a flexible wall material.

8. Apparatus as claimed in claim 7 wherein the flexible wall material comprises a single layer only of said material.

9. Apparatus as claimed in claim 7 wherein the enclosure is made of a plastic material.

10. Apparatus as claimed in claim 1 wherein the evaporation chamber is self-supporting in the inflatable state.

11. Apparatus as claimed in claim 1 wherein the evaporation chamber in the inflatable state is arranged with a shape suitable for preventing the build up of a second fluid on the outer surface of the chamber.

12. Apparatus as claimed in claim 1 wherein the evaporation chamber is elongate and tubular in shape.

13. Apparatus as claimed in claim 1 wherein the liquid to be evaporated can be introduced into the enclosure in a batchwise or a continuous manner via a liquid introduction port located in the exterior of the enclosure.

14. Apparatus as claimed in claim 1 wherein the vapour released from the chamber is condensed by a condenser means located external of the evaporation apparatus.

15. Apparatus as claimed in claim 14 wherein the condenser means comprises a pipe which is arranged external of the evaporation apparatus for condensing of the vapour.

16. Apparatus as claimed in claim 15 wherein the gas in the pipe can be reintroduced into the chamber.

17. Apparatus as claimed in claim 1 wherein the evaporation apparatus is adapted to be floated on a body of liquid.

* * * * *